United States Patent

[11] 3,618,569

| [72] | Inventor | Stephen C. Baer<br>P.O. Box 445, Corrales, N. Mex. 87048 |
| --- | --- | --- |
| [21] | Appl. No. | 852,959 |
| [22] | Filed | July 17, 1969 |
| [45] | Patented | Nov. 9, 1971 |

[54] DEVICE FOR TRANSFERRING HEAT FROM ONE PORTION OF A WATER RESERVOIR TO ANOTHER
1 Claim, 4 Drawing Figs.

[52] U.S. Cl.......................................................... 119/73,
61/1, 119/3, 165/106, 137/334, 137/340
[51] Int. Cl......................................................... A01k 7/00
[50] Field of Search............................................ 165/106,
105; 62/514; 119/3, 73; 137/334, 340; 61/1

[56] References Cited
UNITED STATES PATENTS

| 1,922,509 | 8/1933 | Thurm................................ | 165/106 |
| 2,360,665 | 10/1944 | Fields................................ | 165/105 X |
| 2,644,312 | 7/1953 | Woods et al. ...................... | 165/106 X |
| 3,472,314 | 10/1969 | Balch................................. | 165/106 |
| FOREIGN PATENTS | | | |
| 263,890 | 9/1913 | Germany........................... | 165/106 |

*Primary Examiner*—Albert W. Davis, Jr.
*Attorney*—James E. Snead

ABSTRACT: This invention relates to a device for melting surface ice on a water tank and in particular to a device for maintaining water tanks, such as stock tanks, ice free during the cold months. The device consists of a continuous loop having a hollow interior and filled with volatile liquid which can be circulated through the loop by convection. The loop has two enlarged ends being connected together by a straight portion which is insulated to prevent heat loss in transferring the heat-conveying liquid from one end of the loop to the other.

PATENTED NOV 9 1971 3,618,569

INVENTOR.
Stephen C. Baer

3,618,569

DEVICE FOR TRANSFERRING HEAT FROM ONE PORTION OF A WATER RESERVOIR TO ANOTHER

WATER TANK ICE MELTER

It is well known that one of the difficulties facing a cattle ranching operation is maintaining the stock water tank surface ice free during the cold months. Although horses are able to break surface ice to obtain drinking water, cattle are not. In order to adequately water the cattle during the cold winter months when surface ice forms on the stock watering tanks, it is necessary to run horses with the cattle to break the ice, or to travel to each of the stock watering tanks every day to break the ice, or to provide some type of electrical heater for the surface of the water.

All of the above-mentioned methods are used presently to keep cattle from being deprived of drinking water due to surface ice, but they are expensive, time consuming and require constant attention of the rancher. In particularly bad cold spells, it is inconvenient and difficult to travel to each of the stock-watering tanks daily to break the ice, and electrical heating devices require constant attention and are expensive to install and operate.

One of the peculiarities of water is that it is most dense at 4° C. or 39.2° F. Water at that temperature is more dense than water at the freezing temperature, 0° C. or 32° F. Therefore, on freezing, the denser warmer water sinks to the bottom of the pond and may be as much as 7° F. while the surface water is frozen. Thus, a transfer of the heat from the bottom of the water tank to the top can raise the temperature of the surface several degrees Fahrenheit and prevent freezing.

It is therefore an object of this invention to provide a simple, sturdy device for transferring heat from the warmer portions of the water tank to the surface which is simple to install and operate, requires no attention and can operate for indefinite periods of time without maintenance.

Other and further objects of this invention will appear as the same is better understood by reference to the following specifications and accompanying drawings wherein.

Figure 1:
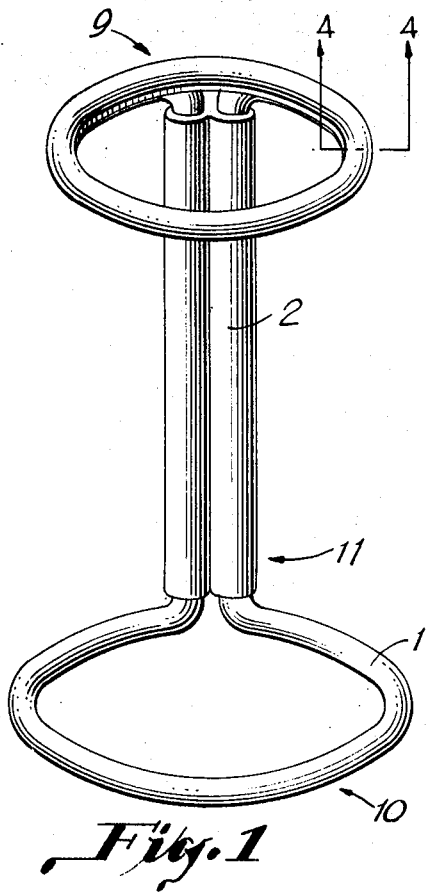
FIG. 1 is a plan view of a preferred embodiment of this invention.
Figure 2:
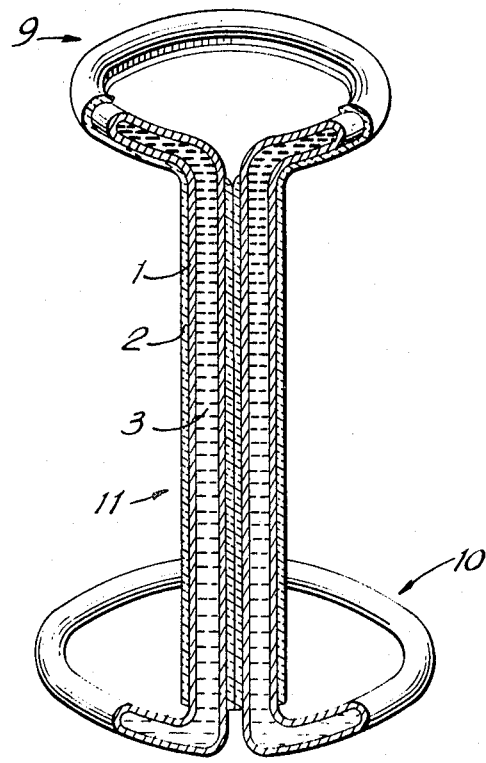
FIG. 2 is a partial cross-sectional view of the device shown in FIG. 1.

Referring now to the drawings wherein like numerals represent like parts, it will be seen that this invention comprises a hollow tube 1 having a first enlarged end 9 and a second enlarged end 10 being connected together by straight tube portions 11. Insulation 2 is provided around the straight portions 11 of tube 1 as well as partially surrounding enlarged end 9 to prevent heat loss therefrom. Tube 1 is hollow and is filled with a heat transfer fluid 3 such as alcohol or some other suitable fluid.

Figure 3:
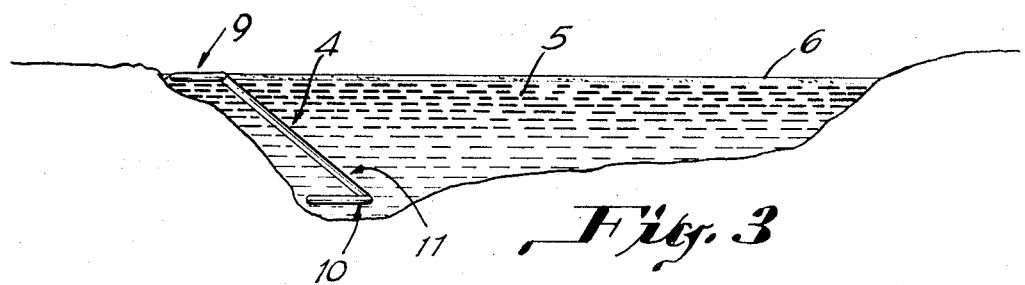
FIG. 3 is a schematic view of the invention shown in operation in a water tank.
Figure 4:
FIG. 4 is a cross-sectional view of the pipe, insulation and interior which comprises this invention.

The water tank melter 4 in operation as shown in FIG. 3 is placed in a water tank or stock pond having water 5 therein with bottom end 10 positioned at or near the lowest water level in the tank. The top end of the ice melter 4 is even with the surface of the water 5 on which ice 6 may be forming. The difference in the temperature between the bottom loop and the top loop causes a convection current in the fluid 3 within tube 1 so that the relatively warmer fluid circulates to the top loop carrying the warmer temperature with it while the cooler fluid circulates to the bottom of the loop where it is in turn warmed by the warmer temperature of the water. Thus, the surface water adjacent to the top loop is raised in temperature to above 0° C. or 32° F. so that it melts. The melting of the ice in an area adjacent the upper loop provides an opening for access to the water by cattle. Of course, several melters 4 may be placed in the tank if desired to melt the ice at various locations, and their lengths may be variable for variations in the depth of the tanks.

Obviously, many modifications of the present invention are possible in light of the above teachings.

What is claimed is:
1. In a stock watering reservoir, an ice melter comprising:
a hollow tube formed in a sealed loop;
said sealed hollow loop having a first enlarged end forming a watering access opening and a second enlarged end, said first and second ends being connected together by straight tube portions;
insulation means surrounding said straight tube portions for reducing heat loss therefrom;
heat transfer fluid filling said sealed hollow tube;
whereby a difference in temperature between said first and second ends of said hollow tube cause a convection current in said heat transfer fluid.

* * * * *